United States Patent
Dressler (10) Patent No.: US 8,974,155 B2
(45) Date of Patent: Mar. 10, 2015

(54) MACHINING TOOL

(75) Inventor: Martin Dressler, Schorndorf-Weiler (DE)

(73) Assignee: Ledermann GmbH & Co. KG, Horb a. N. (DE)

( * ) Notice: Subject to any disclaimer, the term of this patent is extended or adjusted under 35 U.S.C. 154(b) by 0 days.

(21) Appl. No.: 13/519,134

(22) PCT Filed: Jan. 26, 2011

(86) PCT No.: PCT/EP2011/000334
§ 371 (c)(1),
(2), (4) Date: Jun. 26, 2012

(87) PCT Pub. No.: WO2011/092000
PCT Pub. Date: Aug. 4, 2011

(65) Prior Publication Data
US 2012/0282045 A1    Nov. 8, 2012

(30) Foreign Application Priority Data

Jan. 28, 2010 (EP) .................................. 10000837

(51) Int. Cl.
*B23C 5/04* (2006.01)
*B23C 5/08* (2006.01)
(Continued)

(52) U.S. Cl.
CPC ... *B23C 5/04* (2013.01); *B23C 5/08* (2013.01); *B23C 5/18* (2013.01);
(Continued)

(58) Field of Classification Search
CPC ............ B23C 3/13; B23C 3/36; B23C 5/006; B23C 5/04; B23C 5/02; B23C 5/109; B23C 5/207; B23C 5/202; B23C 5/2221; B23C 2200/0416; B23C 2200/125
USPC ............... 407/33, 34, 42, 58, 59, 61; 144/236
IPC .......................................................... B23C 5/04
See application file for complete search history.

(56) References Cited

U.S. PATENT DOCUMENTS

| 953,630 A | * | 3/1910 | Lindley ........................... 407/49 |
| 1,713,273 A | * | 5/1929 | Farrington ...................... 407/31 |

(Continued)

FOREIGN PATENT DOCUMENTS

| AT | 401 488 B | 9/1996 |
| EP | 0 775 560 A2 | 5/1997 |

(Continued)

OTHER PUBLICATIONS

Leitz-Lexicon, Edition 6, Chapter 2, Panel Processing; see cutters on pp. 118 and 121; company brochure, published by Leitz GmbH & Co. KG, Leitzstrasse 2, 73447 Oberkochen, Germany.

*Primary Examiner* — Daniel Howell
*Assistant Examiner* — Alan Snyder
(74) *Attorney, Agent, or Firm* — Gudrun E. Huckett (57) ABSTRACT

The invention relates to a machining tool (14) for machining materials by removing material, in particular for wood or wood-like materials, metals, plastics and/or composite materials. The machining tool is provided to be driven in rotation about an axis of rotation (1) and comprises at least one row (17, 18, 19) of individual cutters (2, 2") arranged in the peripheral direction and having cutting edges (3, 3") which at least partly overlap. The cutting edges (3, 3") have a rake angle and are located at an axial angle ($\lambda$) in relation to the axis of rotation (1). The axial angle ($\lambda$) lies in a range from 55° to <90° inclusive. The rake angle is >55°.

22 Claims, 6 Drawing Sheets

(51) Int. Cl.
*B23C 5/18* (2006.01)
*B27G 13/00* (2006.01)
*B27G 13/02* (2006.01)

(52) U.S. Cl.
CPC ............... *B23C 2210/0407* (2013.01); *B23C 2210/0442* (2013.01); *B27G 13/002* (2013.01); *B27G 13/005* (2013.01); *B27G 13/02* (2013.01)
USPC ........................... 407/59; 407/61; 144/236

(56) References Cited

U.S. PATENT DOCUMENTS

| | | | | |
|---|---|---|---|---|
| 2,212,012 | A | * | 8/1940 | Davidson ................. 407/45 |
| 2,437,669 | A | * | 3/1948 | Adams ..................... 30/347 |
| 2,865,572 | A | * | 12/1958 | Lannert ................... 241/294 |
| 3,776,289 | A | | 12/1973 | Boboltz et al. |
| 4,936,361 | A | | 6/1990 | Mercier |
| 5,083,887 | A | * | 1/1992 | Dotany .................... 407/59 |
| 5,143,311 | A | | 9/1992 | Laster ..................... 241/280 |
| 5,168,907 | A | * | 12/1992 | Herrington et al. ......... 144/228 |
| 5,597,269 | A | | 1/1997 | Ogawa |
| 5,718,540 | A | | 2/1998 | Satran et al. |
| 5,803,674 | A | | 9/1998 | Satran et al. |
| 5,947,649 | A | | 9/1999 | Arai |
| 6,190,096 | B1 | * | 2/2001 | Arthur .................... 407/113 |
| 6,659,694 | B1 | * | 12/2003 | Asbell et al. ............. 407/40 |
| 6,974,280 | B2 | * | 12/2005 | Satran et al. ............ 407/42 |
| 7,708,038 | B1 | * | 5/2010 | Stewart ................... 144/117.1 |
| 8,100,156 | B2 | | 1/2012 | Fischer et al. |
| 2009/0123242 | A1 | * | 5/2009 | Heinloth et al. .......... 407/114 |
| 2011/0044773 | A1 | | 2/2011 | Seidel et al. |

FOREIGN PATENT DOCUMENTS

| | | |
|---|---|---|
| EP | 1 992 463 A2 | 11/2008 |
| FR | 2 703 610 A1 | 10/1994 |
| JP | 62 019314 A | 1/1987 |
| JP | 62-113915 U | 7/1987 |
| JP | 1-138516 U | 9/1989 |
| JP | 6-50720 U | 7/1994 |
| JP | H079233 A | 1/1995 |
| JP | 08-206912 B2 | 8/1996 |
| JP | H09141616 A | 6/1997 |
| JP | H11104991 A | 4/1999 |
| JP | 2005186271 A | 7/2005 |
| JP | 2008284791 A | 11/2008 |
| WO | 2008/113314 A1 | 9/2008 |

* cited by examiner

MACHINING TOOL

BACKGROUND OF THE INVENTION

The invention relates to a machining tool for machining materials by removing material, in particular for wood or wood-like materials, metals, plastics and/or composite materials, provided for rotary drive action about an axis of rotation, comprising at least one row, arranged in circumferential direction, of individual cutters with cutting edges that at least partially overlap each other, wherein the cutting edges have a wedge angle and are positioned at an axial angle relative to the axis of rotation.

When machining materials by removing material, a rework-free smooth surface is desired for which purpose the geometry of the cutting edge of the machining tool must be optimized. However, in particular when machining wood or wood-like materials, different disadvantageous effects can be observed which impair the quality of the machined surface. When machining wood, so-called pre-splitting occurs, for example. When removing a chip in the direction of the fibers, a crack, referred to as pre-splitting, runs ahead of the cutter. This facilitates machining and extends the tool life of the cutter; however, it also results in an undesirable rough surface. Moreover, it can happen that the material fibers stand up again after cutting.

In order to achieve, despite these effects, a rework-free surface as smooth as possible, the cutting edge of the tool must have little cutting edge rounding and a small wedge angle. However, in particular the wedge angle is subject to the limitation that, for various cutter materials, it must not fall below a given value. If the wedge angle is too small, blunting of the cutting edge occurs already at the beginning of the machining process along with an increase of the cutting edge rounding, and/or chipping at the cutting edge occurs with the result that the required cutting quality is not achieved.

Another influencing factor is the material to be machined. For example, in the case of the wood species meranti used in particular for window frames, wear on the cutting edge occurs which is approximately fifty times the wear compared to the cutting edge wear when machining spruce.

Thus, in order to use a wedge angle which, for reasons of wear, on the one hand, is not too small and to use a wedge angle which, for reasons of surface quality, is not too great, high-speed steels with wedge angles between 30° and 45° and carbides with wedge angles between 40° and 55° can usually be used. Harder cutter materials with greater wedge angles cannot be used.

Another influencing factor for influencing the cutting results is the axial angle at which the cutting edge is arranged relative to the rotational axis or its direction of rotational movement. According to the prior art, it is considered to be problematic that, due to the angular position of the cutters, reaction forces occur not only in the direction of rotational movement but also perpendicular thereto in the axial direction. In order to solve this problem, WO 2008/113314 A1 describes a cylindrical milling cutter on which hard metal inserts are aligned section-wise at different axial angle in such a manner that the axial forces generated during the milling process in the different sections at least approximately cancel each other out. However, this does not solve the problem of cutter wear and surface quality so that cutters with the usual wedge angles within the above described limits have to be used.

The object of the invention is to develop further a machining tool of the aforementioned kind in such a manner that despite achieving an improved surface result, a reduced wear occurs.

SUMMARY OF THE INVENTION

This object is achieved by a machining tool characterized in that the axial angle is within a range of 55°, inclusive, to <90°, and in that the wedge angle ($\beta$) is >55°.

According to the invention, it is proposed that the axial angles (inclination angles lambda) of the individual cutters lie in a range from 55', inclusive, to <90°, and that the wedge angles of these cutters are >55° and advantageously lie in a range from 55°, inclusive, to 80°, inclusive. Preferably, the axial angles (inclination angles lambda) lie in a range from 60°, inclusive, to 80°, inclusive, and are in particular approximately 70°.

With the arrangement according to the invention, it is achieved that the cutting edges, due to their great axial angles, are not in perpendicular contact with the workpiece, but contact the workpiece in a peeling cut. Here, no longer a milling action in the classical sense takes place, but a peeling-off action of the material with a directional component which is predominantly perpendicular to the direction of rotational movement. Despite the wedge angle which is excessively large compared to the usual wedge angles for machining tasks, the effective wedge angle, the effective relief angle, and the effective cutting angle composed of the two aforementioned angles become significantly smaller in the aforementioned peeling-action cutting plane. Hereby, pre-splitting is reduced to a minimum. It is avoided that the workpiece fibers stand up again so that rework-free smooth surfaces can be achieved by machining. Moreover, less cutting energy is required, which is an advantage also for non-wood materials. However, for wear of the cutting edge, it is not the aforementioned effective wedge angle measured in the direction of the rotational movement that is relevant, but the actual wedge angle measured in the cross-section of the cutter. Since this wedge angle is adequately large, the cutting edge remains permanently sharp. Cutting edge rounding and the tendency of forming chips in the cutting edge are reduced to a minimum so that an increased tool life of the machining tool is achieved hand in hand with an improved surface result of the cutting process.

In a preferred embodiment, the cutters are formed as circumference cutters having a rotational moving direction, wherein the associated axial angles are measured in a plane spanned by the rotational moving direction and an axial direction parallel to the axis of rotation, and wherein the axial angles are defined between the cutting edge and the axial direction. Circular saw tools, side milling tools, profile and contour milling tools or shank tools, as well as planing tools can be embodied with circumference cutters arranged in such a manner.

In a preferred embodiment, the cutters embodied as circumference cutters are arranged in groups oppositely oriented at axial angles with opposite sign and in particular with same absolute value. The axial force components generated during cutting at the individual cutters at least approximately cancel each other out in this manner. Thereby, reaction forces acting on the tool and also on the workpiece are minimized or eliminated.

In particular, the cutters embodied as circumference cutters are arranged in pairs with opposite orientation. In fact, it can be observed that, when cutting plate-shaped materials, tools with axial angles are significantly louder due to the axial excitation of the plate than tools without axial angles. In the aforementioned configuration according to the invention, because the axial cutting forces on mirror-inverted cutters directly opposing each other in a very small area cancel out so that the machining tool emits less noise.

When large axial angles are used for machining materials, it must be ensured that, at the edges of the material, the cutters are always fed in a direction against the material. When, in fact, the cutting edge is oriented to face away from the material, the risk of the material splintering at the edge increases significantly. In order to be able to find in a simple way for each workpiece width a region of the machining tool in which the cutters at both workpiece edges are arranged inclined toward the workpiece, in a preferred embodiment of the invention the individual groups of cutters and oppositely oriented cutters each have different color markings. This facilitates relative positioning between machining tool and workpiece in such a manner that cutters are used at both workpiece edges that are inclined toward the workpiece, respectively.

In an advantageous variant of the invention, the cutters embodied as circumference cutters are arranged with the same orientation, or predominantly with the same orientation, at axial angles with the same sign and in particular with the same absolute value. This can be expedient, for example, when it is desired to press the workpiece onto a support because of axial reaction forces. For example, in the case of wooden materials coated on both sides, an arrangement of the cutters on both sides against the coating materials is useful. In order to be able to machine different plate thicknesses, such tools are usually embodied with a few cutters in one direction, based on a reference surface in the machine, and the remaining cutters in the other direction. Depending on the machined plate thickness, more or fewer of the remaining cutters then engage in cutting, which results in the desired axial pressing.

In the case of the circumference cutters, the contour distortion with respect to the desired machining contour that is caused by the large axial angle of the cutting edges must be corrected by a suitably adapted contour of the cutting edges. Therefore, the cutting edges of the cutters that are embodied as circumference cutters are advantageously profiled or ground in a crowned manner such that they extend along their entire length on a common cutting circle profile, in particular on a common cutting circle cylinder or cutting circle cone, wherein the cutting circle profile corresponds to the desired milling profile. In this way, a desired exact cylindrical or conical or differently designed milling contour or the respectively desired milling profile is created. In the case of a contour deviating from the cylindrical or conical shape, the course of the circumference cutters is to be corrected in an analogous manner.

In an expedient variant, the cutters with their cutting edges are formed as face cutters having a rotational moving direction, wherein the associated axial angles are measured in a plane spanned by a rotational moving direction and a radial direction perpendicular to the axis of rotation, wherein the axial angles are defined between the cutting edge and the radial direction. Hereby, drill and shank tools can be formed and, at their end face, cutting can be carried out in accordance with the invention.

In a preferred embodiment, the cutters have a planar cutting face. In this way, the cutters and in particular hard cutting plates can be easily produced and sharpened. Alternatively, it can be expedient to provide the cutter with a profiled, in particular concavely curved, cutting face. This profiling then extends so far across the cutting face that also the associated cutting edge is included in the profiling and therefore has no straight course anymore. The axial angle along the entire cutting edge is no longer constant but varies from point to point even though the great average axial angle in the context of the invention is maintained. As a result of the locally varying axial angle, the cutting behavior can be positively affected.

In an advantageous embodiment, the cutters have end faces that are positioned transversely to the rotational movement direction, wherein the end face, starting at the cutting edge, is profiled in the radial direction inwardly. In this way, it is taken into account that the cutters, as a result of the great axial angle in accordance with the invention, contact the workpiece with their end faces leading in the rotational movement direction. In combination with a positive relief angle, this leads to a high load on the leading cutter corner. Because of the profiling according to the invention, this load can be minimized and chipping of the cutter can be prevented.

In an expedient embodiment, the end face is profiled, and in particular concavely curved, such that it adjoins the cutting face at an edge angle that is smaller than 90°. In this way, the leading end face has a less obtuse contact angle with the workpiece. As a result of the acute edge angle, the cutter penetrates in the area of the end face more easily into the material to be machined so that the cutting forces become smaller and, because of the reduced cutting forces, this also contributes to relief of the cutter material or the cutting plate material and the associated cutter corner. The rearward end face can be profiled also, whereby the associated cutter corner is also relieved.

In an expedient variant, the end face is profiled such that it adjoins the cutting face by means of a convex curved portion or a bevel. In this way, the angles within the cutter become more obtuse in the contact area with the workpiece so that the chipping tendency of the cutter material is reduced. In combination with a positive relief angle this also results in the adjoining cutter corner to be rounded or inwardly displaced in radial direction and to be relieved in this way.

It can be expedient to form the cutting edge geometry according to the invention integrally in the machining tool. In an advantageous embodiment, the machining tool comprises a base body and, separately thereof, cutters implemented as cutting plates made of an ultra-hard cutting material, in particular of carbide, cutting ceramics, monocrystalline diamond, PCD (polycrystalline diamond) or CVD (Chemical Vapor Deposition, in particular for diamond coating) which can be produced only in a planar shape. Hereby, the tool life of the machining tool can be further increased in connection with the large wedge angles of these cutter materials, and, in spite of this, an excellent surface result can be achieved because of the reduced effective wedge or cutting angle.

Preferably, the machining tool is composed of at least one, preferably a plurality of individual tools mounted on a shaft. Hereby, it is possible to set different overall milling contours in a modular manner as needed. It is also possible to combine individual tools with different axial angles in order to adjust or eliminate axial reaction forces, or to achieve a certain local cutting result.

Exemplary embodiments of the invention are described in more detail hereinafter with the aid of the drawing. It is shown in.

Figure 1:
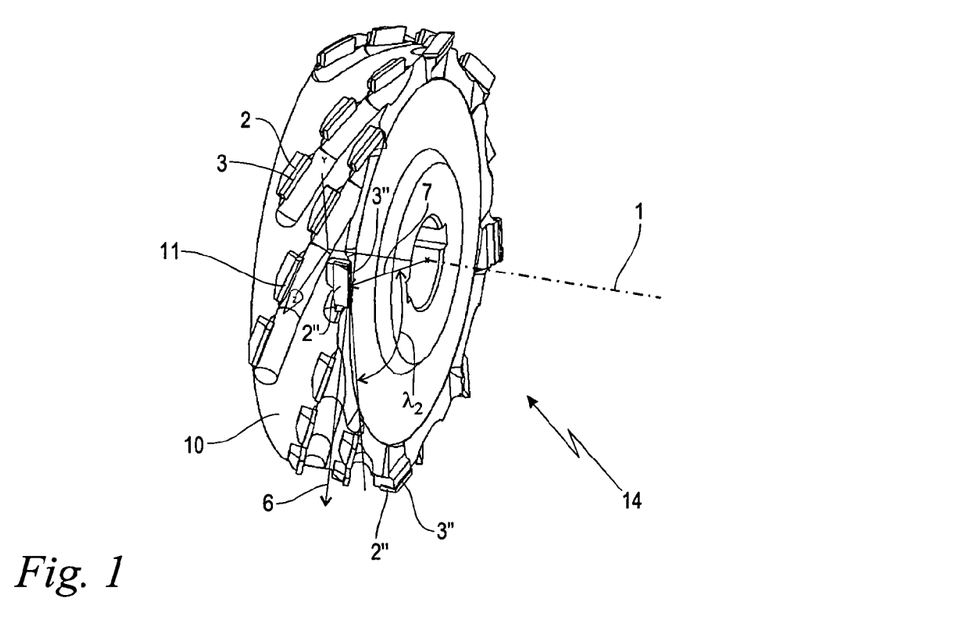
FIG. 1 in a perspective view a first exemplary embodiment of the machining tool according to the invention with circumference cutters oriented in the same direction, and with face cutters in an axial angle arrangement according to the invention.

FIG. 1 shows a perspective view of a first exemplary embodiment of a machining tool 14 implemented according to the invention for machining materials by removing material, in particular for wood or wood-like materials such as coated or uncoated chipboards, hardboards or the like. However, the machining tool 14 can also be suitable for other materials such as fiber-reinforced plastics, metals or the like. The machining tool 14 is configured as a disc milling cutter and provided for being mounted on a non-illustrated tool shaft. During operation, the machining tool 14 is rotatably driven about an axis of rotation 1 perpendicular to the plane of the disc milling cutter.

The machining tool 14 comprises a disk-shaped base body 10 with cutters 2, 2" which, in turn, each have cutting edges 3, 3". Said cutters 2, 2" can be integrally formed with the base body 10 and, in the shown exemplary embodiment, are implemented as cutting plates 11 formed separately from the base body 10. The base body consists of tool steel whereas the cutting plates 11 consist of ultra-hard cutting material such as carbide, cutting ceramics, monocrystalline diamond, PCD or CVD. The cutting plates 11 can be firmly secured to the base body 10, for example, by soldering, adhesive bonding, welding or the like. As an alternative, a detachable attachment can be expedient wherein the cutting plates 11 are fastened, for example, on a carrier and, in this manner, are screwed, clamped or positively secured on the base body 10. The cutters 2, 2" are fixed on the base body 10 in their accurately predetermined spatial alignment. However, it can also be expedient to configure the spatial alignment of the cutters 2, 2" relative to the base body 10 in an adjustable manner.

The base body 10 is formed substantially cylindrically, wherein on its cylindrical circumferential surface a multiplicity of cutters 2 with cutting edges 3 are arranged, wherein the cutters 2 are embodied as circumference cutters. The cutters 2 are arranged in at least one, preferably at least two, here in seven, rows 17, 18 (FIG. 2) arranged in the circumferential direction, wherein the individual rows 17, 18 or groups overlap each other in the axial direction 5 (FIG. 2) in order to achieve a uniform cutting result in this manner. Moreover, in the region of an end face of the base body 10, a row 19 (FIG. 2) of cutters 2" with cutting edges 3" is arranged, which cutters are configured as face cutters. With regard to the axis of rotation 1, the individual cutters 2" embodied as face cutters are arranged in a radial direction 7. Due to the rotational movement of the machining tool 14 about the axis of rotation 1, the individual cutters 2" perform a circular movement perpendicular to the radial direction 7 and to the axis of rotation 1 in a rotational moving direction 6. The rotational moving direction 6 and the radial direction 7 span a plane which lies perpendicular to the axis of rotation 1. The cutting edges 3" of the cutters 2" embodied as face cutters lie in this plane and are arranged at an axial angle $\lambda_2$, measured in this plane, relative to the axial direction 7.

Figure 2:
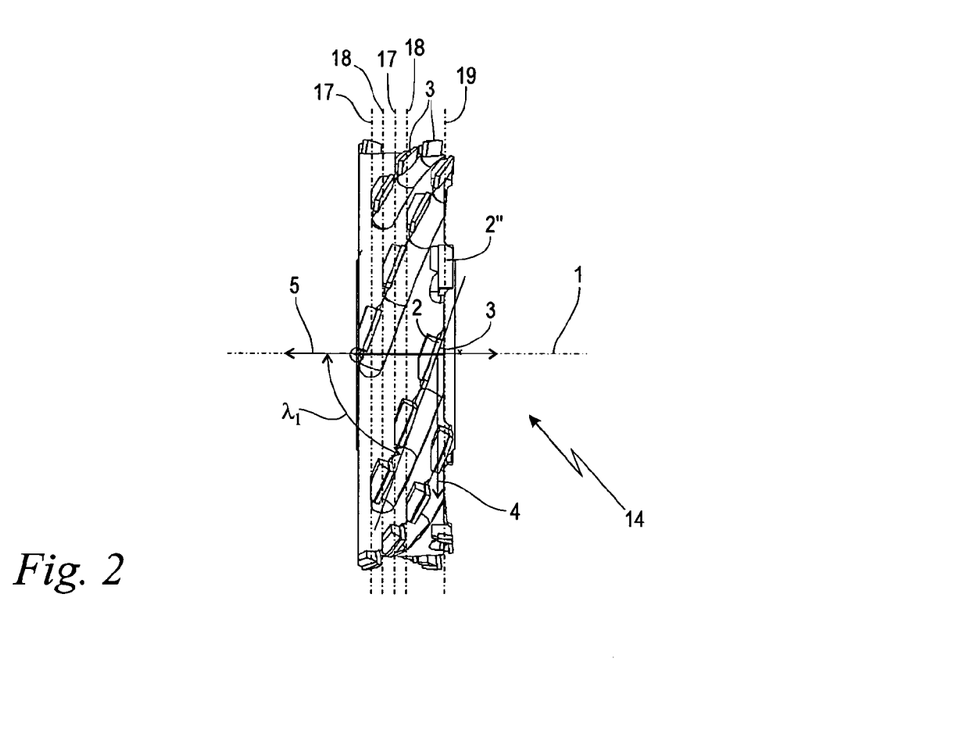
FIG. 2 a circumferential view of the arrangement according to FIG. 1 with details of the axial angle alignment of the circumference cutters.

FIG. 2 shows a circumferential view of the arrangement according to FIG. 1 with further details in regard to its geometrical configuration. Due to the rotational movement about the axis of rotation 1, the cutters 2 embodied as circumference cutters perform a circular movement with a rotational moving direction 4. Moreover, an axial direction 5 which is parallel to the axis of rotation 1 runs through the cutters 2 embodied as circumference cutters. The rotational moving direction 4 and the axial direction 5 span a plane within which, and measured therein, the cutting edges 3 of the cutter 2 embodied as circumference cutters are arranged at an axial angle $\lambda_1$ to the axial direction 5.

The axial angles $\lambda_1$, $\lambda_2$ according to the FIGS. 1 and 2 are in a range from 55°, inclusive, to <90°, preferably in a range from 60°, inclusive, to 80°, inclusive, and each are approximately 70° in the shown exemplary embodiment. All cutters 2 formed as circumference cutters are arranged with the same orientation at axial angles $\lambda_1$ with the same sign and with the same absolute value. For certain machining applications it may also be expedient that the sign of the axial angles $\lambda_1$ but not their absolute value is the same, which can be important, for example, in the case of inhomogeneous materials such as fiber composite materials.

The shown machining tool 14 is configured as a profile milling tool for a cylindrical milling profile. Since the cutting edges 3 of the cutters 2 embodied as circumference cutters extend over a significant circumferential section due to their large axial angle $\lambda_1$, they are formed in a crowned manner such that they extend along their entire length on a common cutting circle cylinder. In the illustration according to FIG. 2, the crowned embodiment can be seen at the upper cutting edges 3.

Instead of the shown cylindrical contour, a different contour, for example, curved or conical, can also be expedient, wherein an analogously adapted course of the cutting edges 3 is to be selected. The axial angle $\lambda_1$ is also determined in this context in an analogous manner.

Figure 3:
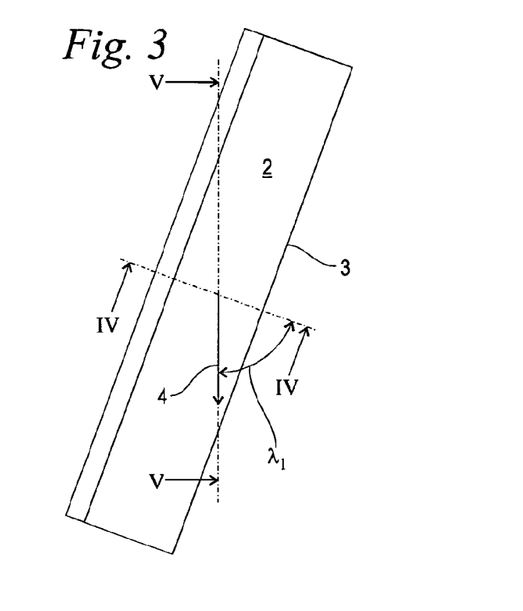
FIG. 3 a schematic plan view of a circumference cutter according to the FIGS. 1 and 2 with information on different cross-sections illustrated in the FIGS. 4 and 5.

FIG. 3 shows a schematic plan view of a cutter 2 implemented as a circumference cutter according to FIGS. 1 and 2 with the associated rotational moving direction 4. Two section lines are drawn through the cutter 2, namely the section line IV-IV perpendicular to the longitudinal axis of the cutter 2 and the section line V-V parallel to the rotational moving direction 4.

Figure 4:
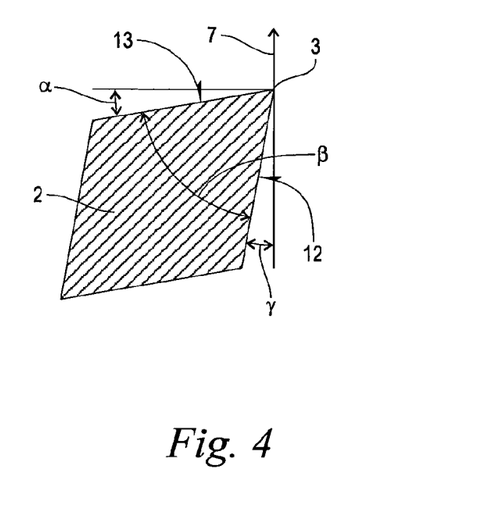
FIG. 4 a cross-sectional view of the cutter according to FIG. 3 in a cross-section perpendicular to the longitudinal cutter axis along the line IV-IV of FIG. 3.

FIG. 4 shows a schematic cross-sectional illustration of the cutter 2 according to FIG. 3 along the section line IV-IV illustrated therein. Accordingly, as an example, the cutter 2 has a trapezoidal cross-section with a wedge angle $\beta$ formed at the cutting edge 3, wherein the wedge angle $\beta$ is defined by a rake face 12 and a flank 13 of the cutter 2. The wedge angle β is supplemented by a relief angle (clearance angle) α and a rake angle γ, adding up in total to 90°. According to the invention, the wedge angle β is ≥55° and lies in particular in a range of 55°, inclusive, to 80°, inclusive, preferably in a range of 60°, inclusive, to 75°, and is 70° in this example, while the relief angle (clearance angle) α and the rake angle γ each are selected to be 10° as an example.

Figure 5:
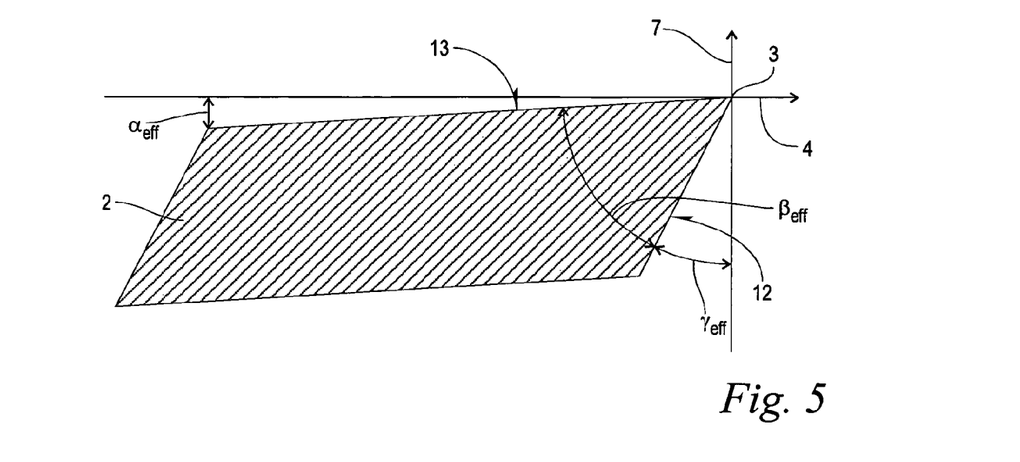
FIG. 5 a cross-sectional view of the cutter according to FIG. 3 in a cross-section parallel to the rotational moving direction along the section line V-V of FIG. 3.

Since, according to the illustration of the FIGS. 1 to 3, the cutters 2 with their cutting edges 3, due to their rotational movement and their axial angle $\lambda_1$, do not impinge perpendicularly to the cutting edge 3 onto the workpiece, thus not along the section line IV-IV according to FIG. 3, but rather move in the rotational moving direction 4 relative to the workpiece, the geometrical conditions along the section line V-V, as shown in the cross-sectional view in FIG. 5, are to be considered for the cutting conditions at the cutting edge 3. In the same manner as the cutting edge 3 is positioned at the axial angle $\lambda_1$ relative to the axial direction 5 (FIG. 2), the section line V-V is also positioned at this axial angle $\lambda_1$ relative to the section line IV-IV. According to the illustration of FIG. 5, compared to the cross-section of FIG. 4, this results in a reduced active or effective wedge angle $\beta_{eff}$ and also in a reduced active or effective relief angle $\alpha_{eff}$, which angles add up to a reduced cutting angle compared to the cross-section of FIG. 4. At the same time, the active or effective rake angle $\gamma_{eff}$ becomes larger compared to the cross-section of FIG. 4. Through mutual adaptation of the actual wedge angle β according to FIG. 4 and the axial angle $\lambda_1$ according to the FIGS. 2 and 3, for a good cutting result the effective wedge angle $\beta_{eff}$ can be reduced in this way, for example, by 20°, with respect to the actual wedge angle β, or can even be reduced to the value of 30° to 55° which is considered a requirement by the prior art.

However, for wear resistance of the cutting edge 3, it is not the effective wedge angle $\beta_{eff}$ according to FIG. 5 that is relevant, but the actual wedge angle β according to FIG. 4. Since, based on the above-mentioned measurements, the latter is very large compared to the prior art, chipping at the cutting edges 3 as well as cutting edge rounding or other signs of wear are reliably prevented, whereby an excellent cutting result with a smooth surface can be achieved for an extended tool life.

Analogously, the same applies also to the cutters 2' with their cutting edges 3' and associated axial angles $\lambda_1'$, described below in connection with the FIGS. 6 and 7, and also to the cutters 2" embodied as face cutters with the cutting edges 3" and the associated axial angles $\lambda_2$ according to the FIGS. 1 and 2.

In the exemplary embodiment according to the FIGS. 1 and 2, the cutters 2 embodied as circumference cutters each have the axial angle $\lambda_1$ oriented in the same direction, which results in axial reaction forces acting in the axial direction 5 (FIG. 2) on the machining tool 14 and also on the workpiece. This can be desired or useful, for example, for pressing the workpiece against a dead stop. If such axial forces are not desired or are to be reduced at least, an embodiment of the invention can be used as shown in an exemplary fashion in the perspective view according to FIG. 6. Here, the cutters 2, 2' embodied as circumference cutters are arranged in groups or rows 17, 18 oriented in opposing directions at associated axial angles $\lambda_1$, $\lambda_1'$ with opposite sign but with the same absolute value. Overall, an identical number of cutters 2 with a positive axial angle $\lambda_1$ and cutters 2' with a negative axial angle $\lambda_1'$ are provided so that the axial forces occurring during the cutting process at least approximately cancel each other out or compensate each other. However, as needed, an arrangement can be expedient in which the absolute values of the axial angles $\lambda_1$, $\lambda_1'$, which are inclined differently with respect to their sign, differ from each other and, where applicable, also vary within a group with identical axial angle sign. This variation of the absolute values of the axial angle can be configured such that the average axial force of a group of cutters. 2 and the average axial force of a group of cutters 2' cancel each other out. Analogously, the same applies also to an arrangement with a different number of cutters 2 and with oppositely oriented cutters 2'. However, it may also be expedient to have a configuration such that no or only a partial compensation of the axial forces occurs so that during operation, as needed, a resulting axial force with respect to absolute value and direction occurs.

It can be expedient to provide groups of cutters 2, 2' having oppositely oriented axial angles $\lambda_1$, $\lambda_1'$ in such a manner that in each case one or several cutters 2 with an associated axial angle $\lambda_1$ and one or several cutters 2' with associated oppositely oriented axial angles $\lambda_1'$ are grouped together side by side. In the exemplary embodiment according to FIG. 6, however, all cutters 2, 2' embodied as circumference cutters are arranged in oppositely oriented pairs so that, in relation to the axial direction 5, next to each cutter 2 with the positive axial angle $\lambda_1$ a directly adjoining cutter 2' with the associated oppositely oriented or negative axial angle $\lambda_1'$ is arranged. The arrangement is selected here in such a manner that the two cutters 3, 3' of such a pair of cutters 2, 2' open in a V-shape in the rotational moving direction 4. However, a reverse arrangement can also be expedient in which the cutting edges 3, 3' extend in an arrow shape toward each other in the rotational moving direction 4.

Figure 6:
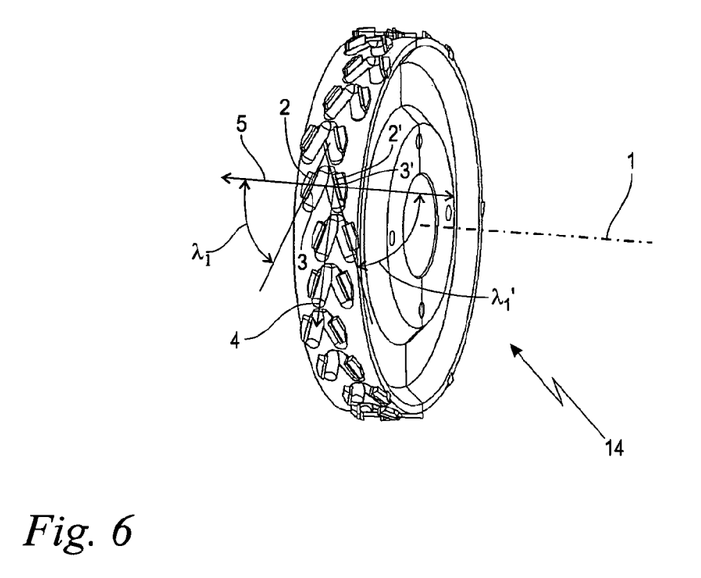
FIG. 6 a variant of the machining tool according to the FIGS. 1 and 2 having cutters arranged in pairs with opposite orientation.
Figure 8:
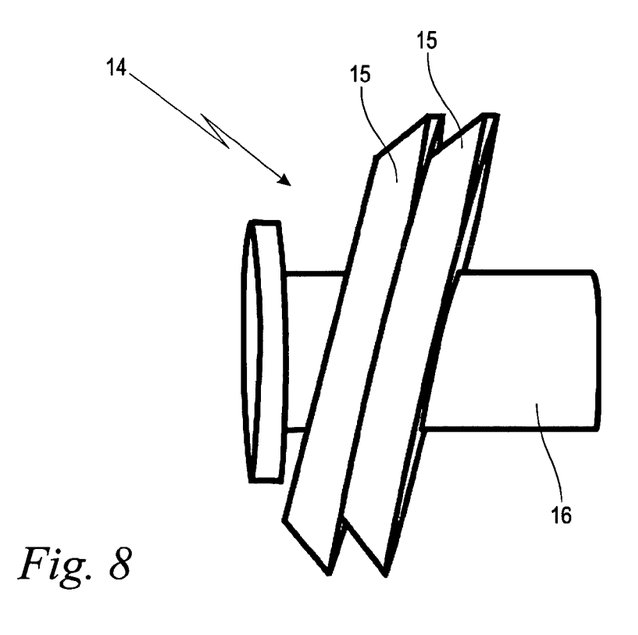
FIG. 8 a further exemplary embodiment of the invention with a complete tool composed of individual tools.

The disk-shaped machining tools 14 embodied as an end mill cutter according to the FIGS. 1, 2 and 6 can be operated as an individual tool 15 or combined in any number by threading them onto a common tool shaft or onto a common motor shaft, mandrel, spindle or shaft 16 so as to form a complete tool, as exemplary and schematically illustrated in FIG. 8. For generating a desired certain milling contour, it can be expedient here that individual tools 15 with the same or different milling contour are used. The individual tools 15 can be assembled to form the desired complete contour so that then the complete machining tool 14 according to the invention is formed and therefore results in the desired complete milling contour. It is also possible in this connection to combine individual tools 15 with different axial angles $\lambda_1$, $\lambda_2$ (FIGS. 1, 2) in order to adjust or eliminate axial reaction forces, or to locally achieve a certain cutting result. Overall, it is possible according to the invention to embody any machining tools 14, for example, in the form of a circular saw tool, a grooving tool, a profile milling tool, or in connection with cutters 2" embodied as face cutters according to FIG. 1, in the form of face milling tools or drilling tools.

Figure 7:
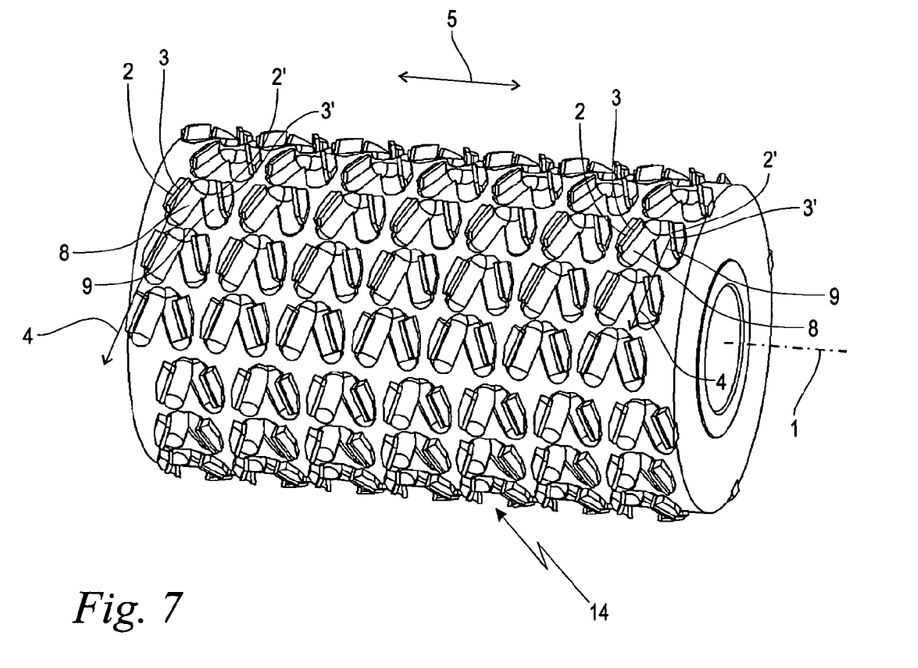
FIG. 7 another exemplary embodiment of the invention in the form of a planing tool having optionally color-marked cutter groups.

FIG. 7 shows in addition a variant of the arrangement according to FIG. 6, in which the machining tool 14 is configured as a planing tool and is configured by axially extending the arrangement according to FIG. 6. The arrangement of the cutters 2, 2' is the same as that of machining tool 14 according to FIG. 6, wherein only greater number of cutters 2, 2' are provided in the axial direction 5 due to the greater longitudinal extension of the machining tool 14 measured in this direction. In such a machining tool 14, exact positioning relative to the workpiece can be important so that, during the machining process, cutters 2, 2' facing each other or facing toward the workpiece engage the workpiece edges in such a manner that fraying of the edges is avoided. In order to make the mentioned relative alignment easier for the worker, the individual groups of cutters 2 and groups of oppositely oriented cutters 2, 2' have optionally in each case different color markings 8, 9 which are visible not only at standstill, but also during the rotating operation of the machining tool 14. During the rotating operation, the color markings 8, 9 generate visible colored circumferential circles by means of which the axial relative alignment of the machining tool 14 and the workpiece can be performed.

In all afore described exemplary embodiments, the rake faces 12 of the cutters 2 or of the cutting plates 11 are planar. This has the result that the cutting edges 3 of the circumference cutters in a radial view parallel to the plane of the rake face 12 have a straight course even though in the view according to FIG. 2 they are ground to have a crowned shape in accordance with the circumferential contour of the machining tool 14. The cutters 2" embodied as face cutters according to FIG. 1 have also planar rake faces 13 and thus straight cutting edges 3".

However, in the context of the invention, it can also be expedient that the cutters 2 have a profiled, preferably curved and in particular concavely curved, rake face 12 as will be disclosed in more detail in the following.

Figure 9:
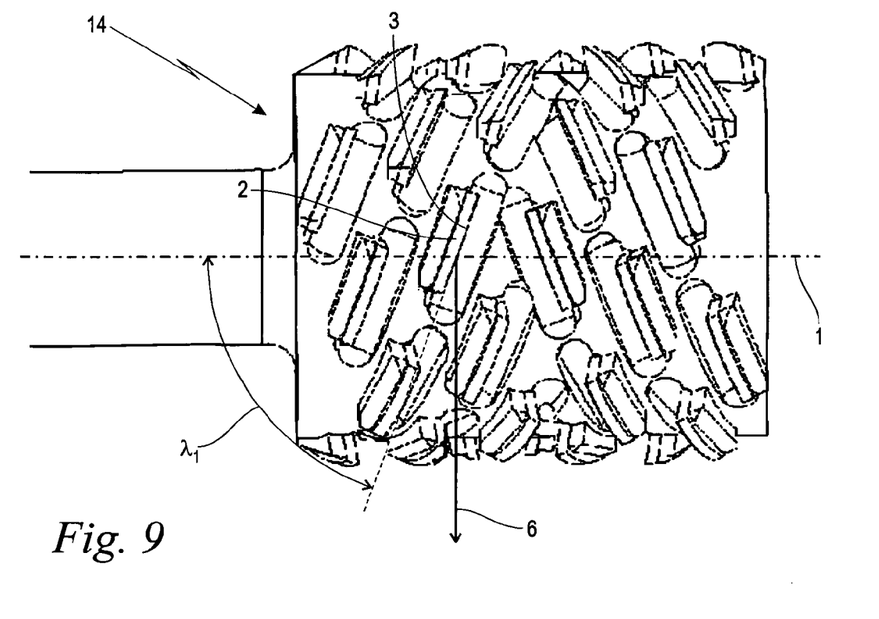
FIG. 9 in a circumferential view a further machining tool embodied in accordance with the invention with profiled circumference cutters.

FIG. 9 shows in a circumference view a further machining tool 14 embodied in accordance with the present invention; in the illustrated exemplary embodiment, it is embodied as a cylindrical milling tool with cutters 2 arranged on the circumferential surface. The cutting edges 3 of the cutters 2 are positioned at an axial angle $\lambda_1$ relative to the axis of rotation 1, or $90°-\lambda_1$ relative to the rotational moving direction 6. In the illustrated embodiment, the axial angle $\lambda_1$ approximately 70° but can also lie within the afore described angular ranges. Moreover, the cutters 2 are arranged in groups with the same absolute value but different signs of the axial angle $\lambda_1$.

Figure 10:
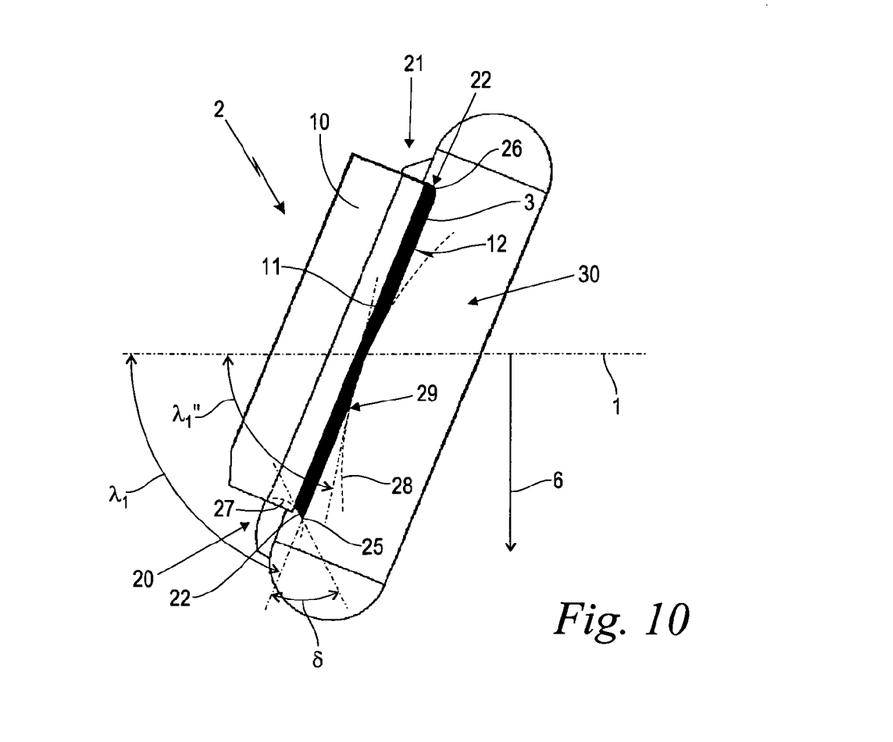
FIG. 10 in a detail view an individual circumference cutter of the machining tool of FIG. 9 with details of its profiling.

FIG. 10 shows in a detail view a single cutter 2 of the machining tool 14 according to FIG. 9 according to which a cutting plate 11 with the cutting edge 3 formed thereat is attached with its rear to a base body 10 and with its oppositely positioned front-side rake face 12 is facing a cutting space 30. The cutting edge 3 extends from a leading cutter corner 25 relative to the rotational movement direction 6 to a rearward cutter corner 26 and has across its course from the leading cutter corner 25 to the rearward cutter corner 26 an average axial angle $\lambda_1$ with the afore described size or within the afore described angular range.

In deviation from the exemplary embodiments of FIGS. 1 to 8, this course is however not exclusively straight. Instead, the cutter 2 has a profiled rake face 12. For this purpose, the rake face 12, as an example, is provided along a cylindrical contour 28 with a concavely curved recess which, in the illustrated embodiment, is arranged at the center area between the two cutter corners 25, 26 and does not extend across the entire length of the rake face 12 measured in the direction of the cutting edge 3. Outside of the concave profiling and adjoining the two cutter corners 25, 26, the rake face 12 is planar so that in this area the cutting edge 3 extends straight parallel to the plane of the rake face 12 in the illustrated radial plan view. In between, the cutting edge 3, in the same view and as a result of the concave cylindrical contour 28, has a curved course in the form of a circular section. From this it follows in accordance with the illustration of FIG. 10 that any point 29 of the cutting edge 3 within the contour 28 is positioned at an axial angle $\lambda_1"$ relative to the axis of rotation 1 which deviates minimally with regard to its absolute value from an average axial angle $\lambda_1$ but is still within the above described limits. At any point 29, the cutting edge 3 thus has an axial angle $\lambda_1"$ that deviates compared to other points within the profiled contour 28. Instead of the illustrated concave cylindrical contour 28, a convex or any other geometric shape can be selected also. Moreover, the contour 28 of the rake face 12 that may be of any shape whatsoever can extend across the entire length of the cutting edge 3.

Moreover, the cutter 2 is also profiled in the area of its cutter corners 25, 26. The plan view of FIG. 10 shows that the cutter 2 has end faces 20, 21 that are substantially positioned perpendicularly to the rake face 12 that, as a result of the large axial angle $\lambda_1$, are positioned transversely to the rotational moving direction 6 at an angle $90°-\lambda_1$. During the cutting process, the cutter 2 impinges on the workpiece not only with its cutting edge 3 and the adjoining rake face 12 but also with the end face 20 that is in front or leading in the rotational moving direction 6. For improving the cutting behavior and for relieving the cutter corner 25 that is leading in the rotational moving direction 6, the cutter 2 or the cutting plate 11 is profiled in the area of leading end face 20. In the illustrated embodiment, the cutting plate 11 at the end face 20 is concavely curved for this purpose in the illustrated radial plan view in such a way that the end face 20 adjoins at an edge angle $\delta$ the rake face 12 wherein the edge angle $\delta < 90°$. In this way, it is avoided that the cutter 2 or the cutting plate 11 in the area of its leading cutter corner 25 impinges at an obtuse angle on the workpiece. For forming the edge angle $\delta$ by means of the concavely curved end face 20, a cylindrical contour 27 illustrated in dashed lines is selected in the illustrated exemplary embodiment. However, a deviating contour may be expedient also.

Figure 11:
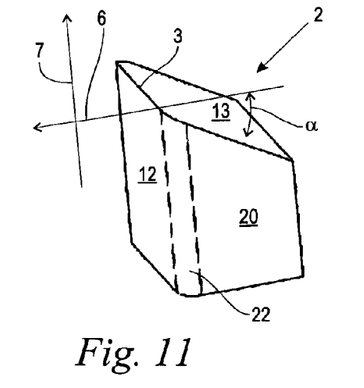
FIG. 11 in a perspective schematic illustration a cutter with rounded profiled end face.
Figure 14:
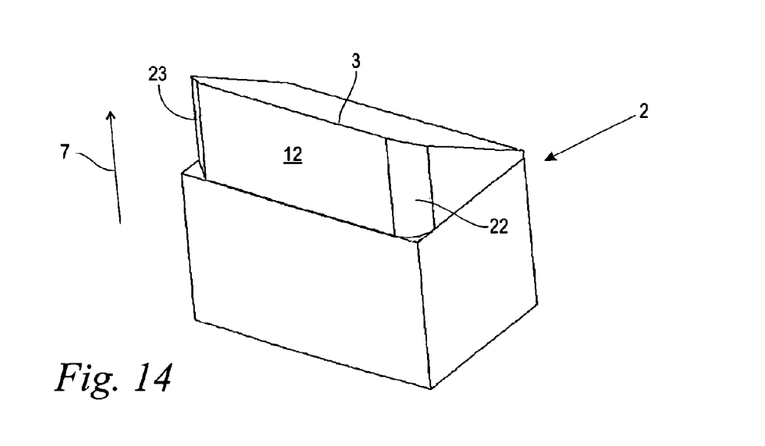
FIG. 14 in a perspective illustration a variant of the cutter according to FIGS. 11 to 13 with profilings embodied only in immediate vicinity of the cutting edge.

Moreover, the cutter 2 or the cutting plate 11 may also be optionally profiled in the area of its rearward trailing end face 21 adjoining the rear cutter corner 26 for which purpose in the illustrated exemplary embodiment a convex rounded portion 22 is provided that is illustrated in FIGS. 11 and 14 in detail. In this context, a deviating contour of the profiling of the end face 21 may be expedient also.

Figure 12:
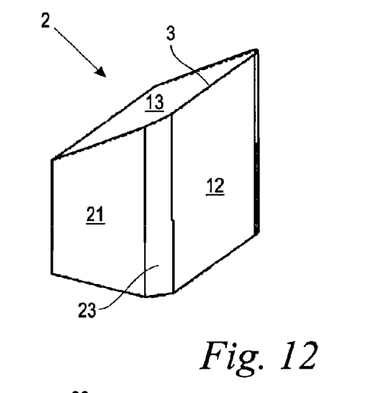
FIG. 12 a rotated view of the cutter of FIG. 11 with an oppositely positioned end face that is profiled by a bevel.

FIG. 11 shows in a perspective schematic illustration a cutter 2 with further details in regard to its contoured configuration relative to the rotational moving direction 6 and the radial direction 7. In the rotational moving direction 6 in leading position the cutter 2 has a rake face 12 as well as, in radial direction 7 facing outwardly, a flank 13 wherein the flank 13 and the rotational moving direction 6 define a positive relief angle $\alpha$ comparable to the illustration of FIG. 4. Transversely or perpendicularly to the rake face 12 and to the flank 13, the end face 20 and, positioned oppositely thereto, the end face 21, illustrated in FIG. 12, are provided. The end faces 20, 21, starting at the cutting edge 3 formed between the rake face 12 and the flank 13, are profiled opposite to the radial direction 7, i.e., extending in radial direction inwardly. In the embodiment according to FIG. 11, this profiling is selected such that the end face 20 adjoins the rake face 12 by means of a convex rounded portion 22.

FIG. 12 shows the cutter 2 according to FIG. 1 in a position rotated such that adjacent to the rake face 12 and the flank 13 also the end face 21 that is opposite to the end face 20 (FIG. 11) is visible. Accordingly, the end face 21 is profiled such that it adjoins the rake face 12 by means of a bevel 22 that extends from the cutting edge 3 in radial direction inwardly.

Figure 13:
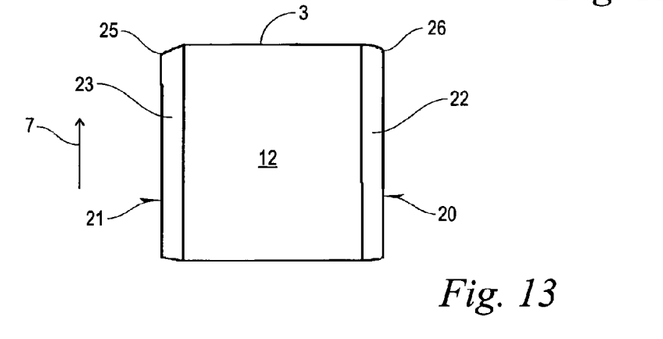
FIG. 13 in a front view the cutter of the FIGS. 11 and 12 with details in regard to the cutter corners that are displaced in radial direction inwardly as a result of the profiling.

FIG. 13 shows an end view of the cutter 2 according to FIGS. 11 and 12. When looking at FIGS. 11, 12, and 13 jointly, it is apparent that, as a result of the convex rounded portion 22 and/or the bevel 23 in combination with the positive relief angle $\alpha$ (FIG. 11), a radial displacement of the cutter corners 25, 26 results. The cutter corner 25 adjoining the end face 20 and the cutter corner 26 adjoining the end face 21 are displaced in radial direction inwardly relative to the cutting edge 3 in a direction opposite to the radial direction 7 and therefore are relieved upon impinging on the workpiece despite the large axial angle $\lambda_1$ (FIG. 10).

In the embodiment according to FIGS. 11 to 13, the profiling of the end faces 20, 21 in the radial direction 7 extends about the entire height of the cutter 2. Alternatively, an embodiment according to FIG. 14 can be expedient according to which, relative to the radial direction 7, the convex rounded portion 22 or the bevel 23 is formed only on the outer portion that directly adjoins the cutting edge 3. The same applies in the same sense also for the profiled or concavely curved rake face 12 according to FIG. 10.

The convex rounded portion 22 at the end face 22 and the bevel 23 at the end face 21 represent only one of several possibilities. Each end face 20, 21, as desired, can have one of the aforementioned profilings including the concavely curved embodiment according to FIG. 10 but also with a different type of profiling. Moreover, it can be expedient to provide only one of the two end faces 20, 21, and in particular the leading end face 20, with an appropriate profiling.

The profiling of the rake face 12 end of the end faces 20, 21 is illustrated in accordance with FIGS. 9 to 14 in an exemplary fashion for cutters 2 embodied as circumference cutters but can also be applied in an analogous manner to the cutters 2″ embodied as face cutters according to FIGS. 1 and 2. If not expressly indicated differently, the embodiments according to FIGS. 9 to 14 correspond with regard to the remaining features and reference numerals to each other as well as to the embodiments according to FIGS. 1 to 8.

What is claimed is:

1. Machining tool (14) for machining materials by material removal, provided for rotary drive action about an axis of rotation (1), wherein the machining tool (14) has a base body (10) and, separate from the base body (10), at least one row (17, 18, 19), arranged in circumferential direction, of individual cutters (2, 2′, 2″) embodied as flat cutting plates (11) of an ultra-hard cutting material, wherein the flat cutting plates (11) each have a cutting edge (3, 3′, 3″) and the cutting edges (3, 3′, 3″) at least partially overlap each other, wherein the cutting edges (3, 3′, 3″) each have a wedge angle ($\beta$) and the cutting edges (3, 3′, 3″) each are positioned at an inclination angle lambda ($\lambda_1, \lambda_1', \lambda_1'', \lambda_2$) relative to the axis of rotation (1), wherein the wedge angle ($\beta$) is measured in a plane perpendicular to the cutting edge (3, 3′, 3″), characterized in that the inclination angle lambda ($\lambda_1, \lambda_1', \lambda_1'', \lambda_2$) is within a range of 55°, inclusive, to <90°, and in that the wedge angle ($\beta$) is >55°.

2. Machining tool according to claim 1, characterized in that the wedge angle ($\beta$) is in a range of 55°, inclusive, to 80°, inclusive.

3. Machining tool according to claim 1, characterized in that the inclination angle lambda ($\lambda_1, \lambda_1', \lambda_1'', \lambda_2$) is in a range of 60°, inclusive, to 80°, inclusive.

4. Machining tool according to claim 1, characterized in that the cutters (2, 2′) with their cutting edges (3, 3′) are embodied as circumference cutters with a rotational moving direction (4), wherein the associated inclination angles lambda ($\lambda_1, \lambda_1', \lambda_1''$) are measured in a plane that is spanned by the rotational moving direction (4) and an axial direction (5) that is positioned parallel to the axis of rotation (1), and wherein the inclination angles lambda ($\lambda_1, \lambda_1', \lambda_1''$) are formed between the cutting edge (3, 3′) and the axial direction (5).

5. Machining tool according to claim 4, characterized in that the cutters (2, 2′) embodied as circumference cutters are arranged in groups oppositely oriented at inclination angles lambda ($\lambda_1, \lambda_1', \lambda_1''$) with opposite sign and with same absolute value.

6. Machining tool according to claim 5, characterized in that the cutters (2, 2′) embodied as circumference cutters are arranged in pairs with opposite orientation.

7. Machining tool according to claim 5, characterized in that the individual groups of cutters (2) and oppositely oriented cutters (2′) each have a different color marking (8, 9).

8. Machining tool according to claim 4, characterized in that the cutters (2) formed as circumference cutters are arranged with same orientation or primarily same orientation at inclination angles lambda ($\lambda_1$) with same sign and with same absolute value.

9. Machining tool according to claim 1, characterized in that the cutting edges (3, 3′) of the cutters (2, 2′) embodied as circumference cutters are profiled with a crown profile such that along their entire length they extend on a common cutting circle profile and on a common cutting circle cylinder.

10. Machining tool according to claim 1, characterized in that the cutters (2, 2′, 2″) have planar rake faces (12).

11. Machining tool according to claim 1, characterized in that the cutter (2) has a profiled and concavely curved rake face (12).

12. Machining tool according to claim 1, characterized in that the cutters (2) have end faces (20, 21) positioned transversely to the rotational moving direction (6), wherein the end face (20, 21), beginning at the cutting edge (3), is profiled in the radial direction (7) inwardly.

13. Machining tool according to claim 12, characterized in that the end face (20) is profiled and concavely curved such that it adjoins the rake face (12) at an edge angle ($\delta$) that is smaller than 90°.

14. Machining tool according to claim 12, characterized in that the end face (20) is profiled such that it adjoins the rake face (12) by means of a convex round portion (22).

15. Machining tool according to claim 12, characterized in that the end face (21) is profiled such that it adjoins the rake face (12) by means of a bevel (23).

16. Machining tool according to claim 1, characterized in that each flat cutting plate (11) has a planar rake face (12).

17. Machining tool according to claim 1, characterized in that the machining tool (14) is composed of at least one individual tool mounted on a shaft (16).

18. Machining tool according to claim 16, wherein the ultra-hard cutting material is selected from carbide, cutting ceramics, monocrystalline diamond, or PCD.

19. Machining tool according to claim 1, wherein, measured in said plane perpendicular to the cutting edge (3, 3′, 3″), the wedge angle ($\beta$) of the cutting edge (3) is supplemented by a clearance angle ($\alpha$) and a rake angle ($\gamma$), wherein the clearance angle ($\alpha$), the wedge angle ($\beta$) and the rake angle ($\gamma$) are adding up in total to 90°, and wherein the clearance angle ($\alpha$) is positive and >0°.

20. Machining tool according to claim 19, wherein the rake angle ($\gamma$) is 10°.

21. Machining tool according to claim 19, wherein the clearance angle ($\alpha$) is 10°.

22. Machining tool according to claim 1, wherein:
the cutting edges (3, 3', 3") together define a common cutting circle profile in an axial plane of the machining tool when the machining tool rotates in a rotational moving direction;
the cutting edges (3, 3', 3") each have a length extension;
the inclination angle lambda ($\lambda_1, \lambda_1', \lambda_1'', \lambda_2$) is determined at a reference point of the length extension of the cutting edge (3, 3', 3");
the inclination angle lambda at said reference point is measured between:
- a first tangent to the cutting edge at said reference point, the first tangent extending in a direction of the length extension of the cutting edge, and
- a second tangent to the cutting circle profile in said axial plane at said reference point, wherein the inclination angle lambda is measured in a measuring plane, said measuring plane defined by the second tangent that defines a first extension of said measuring plane, wherein a second extension of said measuring plane is perpendicular to said first extension and extends in the rotational moving direction.

* * * * *